Aug. 18, 1964     W. F. COOMBS, JR     3,144,807
OPTICAL ELECTRIC SYSTEM FOR USE WITH MEASURING INSTRUMENT
Filed June 18, 1962
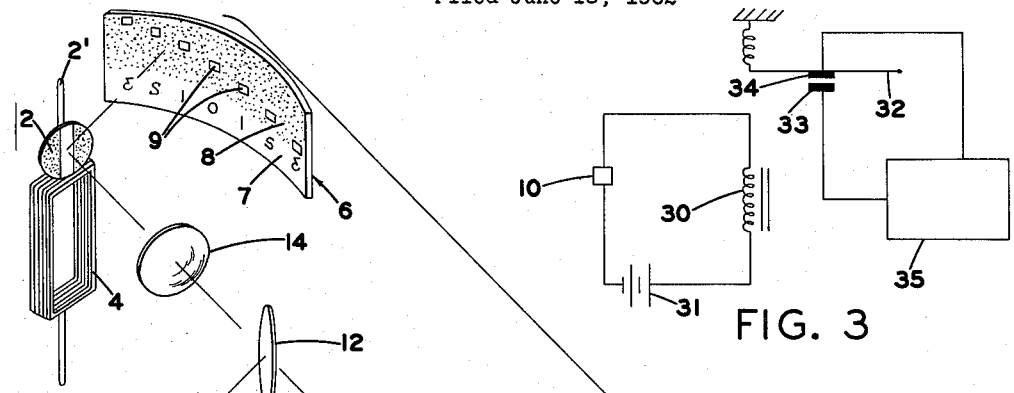
FIG. 3
FIG. 1
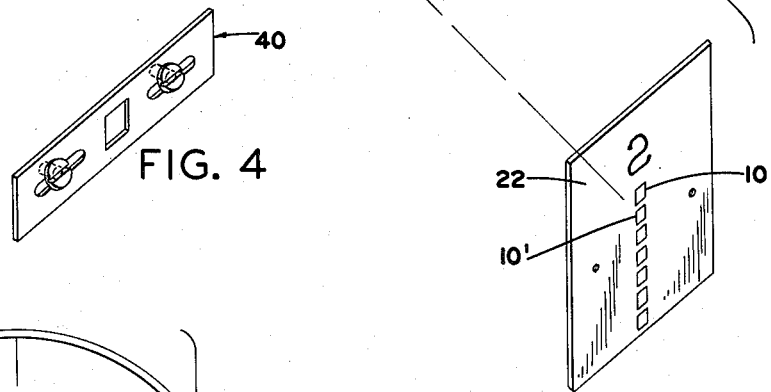
FIG. 4
FIG. 2
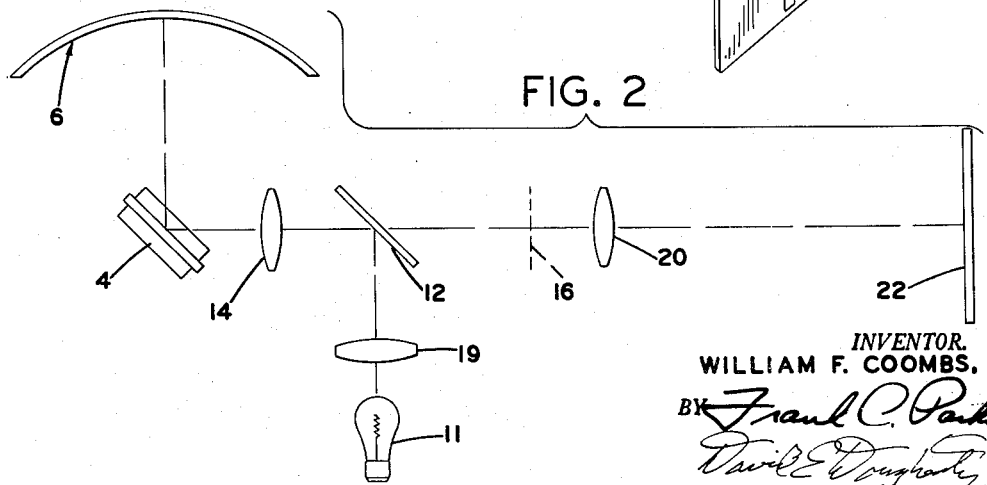
*INVENTOR.*
WILLIAM F. COOMBS, JR.
BY
ATTORNEYS United States Patent Office 3,144,807
Patented Aug. 18, 1964

3,144,807
OPTICAL ELECTRIC SYSTEM FOR USE WITH MEASURING INSTRUMENT
William F. Coombs, Jr., Irondequoit, N.Y., assignor to Bausch & Lomb Incorporated, Rochester, N.Y., a corporation of New York
Filed June 18, 1962, Ser. No. 203,205
4 Claims. (Cl. 88—24)

This invention relates to an optical electric system and more particularly to an optical electric system which produces a visible indication and an electrical signal in response to changes in the position of a rotatable element.

In optical read-out systems for use with galvanometers or the like it is desirable to project a scale image onto a screen. One system of this type is disclosed in the co-pending application of Leslie O. Vargady entitled "Optical System" Serial Number 149,646 filed November 2, 1961, now Patent No. 3,114,284 and assigned to the same assignee as the present application. It has been found desirable particularly in a measuring instrument or the like such as a galvanometer read-out system of the type called for in the aforementioned copending application to include electrical means for simultaneously producing electrical signals in repsonse to movements of a rotatable element.

The novel combination disclosed herein includes the advantageous features called for in the aforementioned application. The present combination further includes electrical means which are activated by a light signal. The use of the light signal takes advantage of the angular magnification obtained by the optical system. For example, an array of photosensors are adapted to produce an electrical signal in response to a light signal.

In some cases it may be desirable to include control means responsive to the electrical signals for controlling a variable to thereby compensate for any changes in the rotatable element. The present system produces practical means for indicating a plurality of changes. This feature is somewhat analogous to a multiposition switch. Accordingly each indication may be used to indicate a predetermined state, and control means responsive to such indications may be adapted to compensate for such changes. In some cases the electrical signal is associated with an alarm contact for indicating a predetermined state.

Even though photosensors are presently available in relatively small sizes it is desirable to utilize the angular magnification provided by the optical system. The optical magnification improves the sensitivity of the device. The magnification is also effective in producing readings which may be readily repeated. Furthermore the electrical structure is independent of the relatively sensitive meter and therefore has no detrimental effect on a highly sensitive meter which actuates the rotatable element.

A system according to the present invention may include an additional optical magnifying system for magnifying the visible signal. The electrical system and the additional magnifying system are particularly advantageous in situations where it is desirable to make numerous readings in a short time interval. Accordingly the presently proposed system may be adapted for use with a strip chart recorder or other means for recording changes.

The advantageous features of a device according to the present invention may be obtained at a relatively low cost. The device is relatively compact, relatively durable in use, and relatively inexpensive to manufacture. Accordingly, a device according to the present invention may be marketed in the relatively competitive commercial field.

Briefly, the present invention comprises a novel optical electrical system for use in measuring instruments or the like. For example, an optical system may be used in a galvanometer or adapted to any meter whenever a pivoted element rotates on an axis. The system includes a rotatable mirror generally similar to the type used in conventional galvanometers. A concave scale having a generally cylindrical shape includes a reflective surface and means for producing an optical signal. Means including a light source are adapted to project a beam of light by way of the rotatable mirror onto the concave scale. The scale reflects the light impinging thereon and the optical signal back by way of the rotatable mirror to an image plane for indicating changes in the position of the rotatable mirror. Means including a plurality of photosensors detect the optical signals and convert the optical signals to electrical signals. Means may also be provided for visually indicating the position of the rotatable element.

The invention will now be described in more detail in connection with the accompanying drawings; in which, FIG. 1 is a perspective view somewhat schematic of a novel optical electric system according to the invention;

FIG. 2 is a side elevational view illustrating the optical electric system shown in FIG. 1;

FIG. 3 is a schematic illustration of an electric circuit for use in the novel optical electric system disclosed herein; and, FIG. 4 illustrates means for adjusting the relative position of a photosensor and a corresponding area portion.

An optical electric system according to the present invention includes a rotatable mirror 2 fixed to a rotatable member 4. The member 4 shown in FIGS. 1 and 2 is a moving coil of the type used in conventional galvanometers. A concave cylindrical scale 6 having a radius of curvature equal to the distance from the scale to the mirror's axis 2' of rotation includes a reflective portion 7 and a non reflective portion 8.

The reflective portion 7 includes digital representations. Images of the respective representations form the visible indication of the rotatable elements position. The non reflective portion 8 includes a stepped array of discrete area portions 9. Each of the discrete area portions 9 is reflective and produces a light signal. Each area portion has a corresponding photosensor 10 which produces an electrical signal in response to the light signal.

In the preferred embodiment the photosensors 10 are located on the screen one above the other. The discrete reflective area portions are imaged on the screen to thereby produce a light signal. The number 10' indicates the photosensor which receives the light signal as illustrated in FIG. 1. This signal indicates the positions of the movable element 4. In some cases it may be desirable to coat the discrete area portions with a non reflective coating and arrange the area portions on a reflective surface. In this event each photosensor will be continuously illuminated and the light signal will be an interruption in the continuous illumination.

A light source 11 and a beam splitter 12 are adapted to project a beam of light onto the mirror 2. The light beam is reflected by the mirror 2 onto the cylindrical scale 6. The reflective surface 7 of the scale 6 reflects the light beam back by way of the rotatable mirror 2 through an image forming element 14, the beam splitter 12 and onto an image plane 16.

The element 14 is effective to project an image of the scale representations and the light signal to the image plane 16. The element 14 is a part of the illumination system which produces optimum illumination of an area of the scale. An additional lens 19 such as a condenser lens is disposed between the light source 10 and the beam splitter 12 in order to improve the characteristics of the illumination system.

A projection lens 20 may also be incorporated in the system for magnifying the image of the illuminated portion of the scale 6. An aerial image formed at the image plane 16 is projected through the lens 20 onto a screen 22. In this arrangement the photosensors are located in a stacked array on the screen 22 below the imaging area.

FIG. 3 illustrates schematically circuit means which may be associated with each of the photosensors shown in FIG. 1. For example, each photosensor 10 and a relay coil 30 are connected in series across a source of electrical energy 31. When a light pulse strikes the photosensor the current flow increases through the relay coil 30. The current flow energizes the relay coil 30 causing a contact arm 32 to pivot to thereby open or close the contacts 33, 34 in a suitable measuring or control circuit 35.

It has been found desirable in certain situations to adjust the relative position of a photosensor with respect to a corresponding discrete area portion. This adjustment may be accomplished by a slight displacement of the photosensor. In such case means such as the slide assembly 40 shown in FIG. 4 may be mounted on a screen such as the screen 22. It may also be desirable as an alternative to provide adjusting means for displacing the discrete area portions 9 on the circular scale 6.

For practical purposes it has been found desirable to use a cylindrical scale, however the cylindrical scale may be replaced with a spherical scale without departing from the scope of the invention. It is envisioned that numerous changes and modifications may be made in the present system without departing from the spirit or scope of the appended claims:

What is claimed is:

1. An optical electric system for use with a measuring instrument including in combination a rotatable mirror, a concave scale and an image plane, a screen disposed at said image plane, means including a light source for projecting a beam of light by way of said rotatable mirror onto said concave scale, said concave scale including a reflective surface and scale representations on said reflective surface, said reflective scale retrodirecting the light rays projected thereupon, and means producing an optical signal associated with said circular scale but separate from said scale representations, an optical image forming element placed on the optical axis of the system between said scale and said image plane whereby light including the optical signal is retrodirected by said concave scale by way of said rotatable mirror and through said optical imaging forming element to thereby form an image of an illuminated portion of said scale on said screen, means including a plurality of photoelectric cells detecting the optical signals, electrical circuit means associated with said photoelectric cells indicating changes in the position of the rotatable mirror.

2. An optical electric system according to claim 1 which includes means adjusting the relative position between the optical signal producing means and the photoelectric cell.

3. An optical electric system for use with a measuring instrument comprising a rotatable mirror, a concave scale and an image plane, means including a light source for projecting a beam of light by way of said rotatable mirror onto said concave scale, said concave scale including a reflective surface for reflecting the beam of light and a non reflective surface adjacent to said reflective surface, said non reflective surface including discrete reflective area portions thereon for producing an optical signal in response to the illumination, an optical image forming element placed on the optical axis of the system between said scale and said image plane whereby light including the optical signal reflected by said concave scale is directed by way of said rotatable mirror through said optical image forming element to thereby form an image of an illuminated portion of said scale at said image plane, and means including a plurality of photosensors detecting the optical signals.

4. An optical electric system according to claim 3 which includes electrical circuit means indicating changes in the position of said rotatable mirror.

References Cited in the file of this patent

UNITED STATES PATENTS

| 1,859,047 | Paulson | May 17, 1932 |
| 2,854,628 | Te Gude | Sept. 30, 1958 |